United States Patent [19]

Horikawa

[11] 3,850,821

[45] Nov. 26, 1974

[54] BEARINGS
[75] Inventor: Masayuki Horikawa, Tokyo, Japan
[73] Assignee: Oiles Kogyo Kabushiki Kaisha, Tokyo, Japan
[22] Filed: June 11, 1973
[21] Appl. No.: 368,510

Related U.S. Application Data

[63] Continuation-in-part of Ser. Nos. 606,389, Dec. 30, 1966, abandoned, and Ser. No. 851,717, Aug. 20, 1969, Pat. No. 3,606,657, and Ser. No. 140,739, May 6, 1971, abandoned.

[52] U.S. Cl. ............................ 252/12.2, 252/12
[51] Int. Cl. ..... C10m 7/26, C10m 7/24, C10m 7/22
[58] Field of Search .......... 252/12, 12.2, 12.4, 12.6

[56] References Cited

UNITED STATES PATENTS

| 3,224,967 | 12/1965 | Battista | 252/12.2 |
| 3,380,843 | 4/1968 | Davis | 252/12.2 |

Primary Examiner—Daniel E. Wyman
Assistant Examiner—I. Vaughn
Attorney, Agent, or Firm—Oldham & Oldham Co.

[57] ABSTRACT

A method of making a lubricant impregnated bearing which comprises mixing polyacetal powder resins with lubricant, heating to melt, cooling to solidify the impregnated product, forming powder from the impregnated product and molding powder into bearings.

7 Claims, 1 Drawing Figure

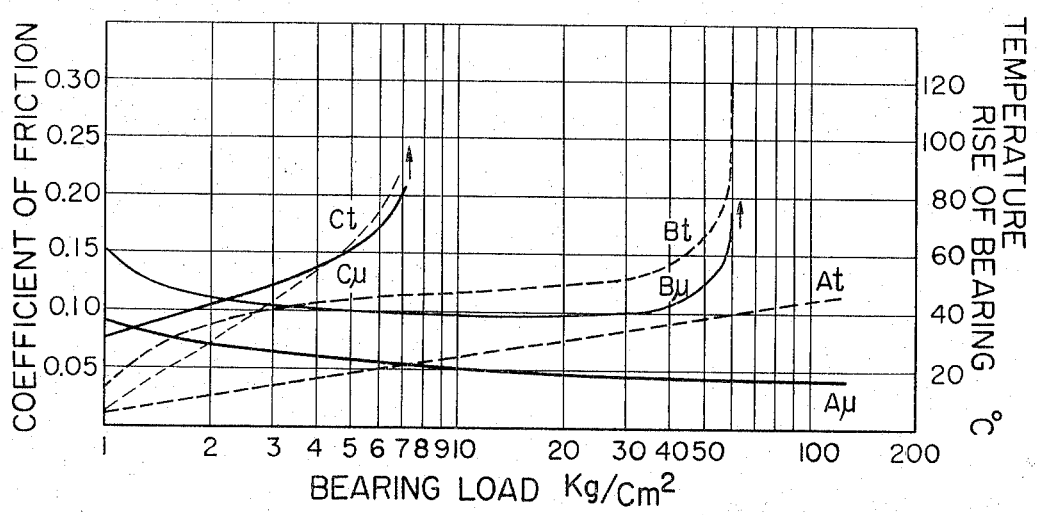

BEARINGS

This is a continuation-in-part of my prior applications Ser. No. 606,389, filed Dec. 30, 1966; now abandoned; Ser. No. 851,717, filed Aug. 20, 1969, now U.S. Pat. No. 3,606,657; and Ser. No. 140,739, filed May 6, 1971 now abandoned.

This invention relates to the making of bearings and more particularly to a new method of preparing a thermoplastic synthetic resin material containing bearings formed of polyacetal resin material containing a lubricant dispersed therein in the particulate form and of making bearings from such particulate material by molding.

The present invention is principally based upon the discovery of the fact that polyacetal resins exhibit a substantially increased affinity to but do not dissolve in such lubricants as mineral oil at temperatures exceeding their melting points though they exhibit a substantial oil resistance at room temperature and such resins thus can hold lubricating oil in a particulate state in the fine resin structure. According to the present invention, a method is proposed of making bearings from polyacetal resins and in which said resins of powder form are mixed with an excess amount of lubricant and the mixture is subjected to heat treatment at a temperature not lower than the melting point of said resins and then cooled to obtain a deposit. Said deposit is reduced into powder form resulting in obtaining a desired lubricant containing polyacetal resin material, which is moldable into bearings.

From the bearing material and other practical viewpoints, the following process is followed in practicing the present invention; namely, the polyacetal resin material with a lubricant held in a particulate state in the fine inner structure of the resin is first divided into powder or particulate form and then the powdery material is molded into desired lubricant containing bearing or other shapes by a conventional extrusion, injection or compression molding technique.

The object of the present invention is to provide an efficient method of manufacturing the lubricant containing polyacetal bearings that have the lubricant uniformly dispersed therein. The lubricant is in a liquid state at normal room temperatures and/or at the melting point or a temperature less than the melting point of the polyacetal.

Another object of the present invention is to provide an efficient method of manufacturing the lubricant containing polyacetal bearings having excellent bearing performances such as a self-lubricating property and good load carrying capacity, etc.

The polyacetal resin used in the invention comprises a homopolymer of formaldehyde, or an oxymethylene copolymer of trioxane and ethylene oxide.

Namely one of the polyacetals used in this invention is a homopolymer of formaldehyde as disclosed in U.S. Pat. No. 2,768,994, and is trade named "Derlin," being sold by E.I. du Pont de Nemours Co., U.S.A.

Another polyacetal used in this invention is oxymethylene copolymer of trioxane and ethyleneoxide (mole ratio of trioxane: ethylene oxide = 100: about 0.1 – 15) disclosed in U.S. Pat. No. 3,027,352 specification which has a softening point of 162° C., a melting point of 163° C., a molecular weight of 50,000 and is trade named "Celcon" and sold by Celanese Corporation, U.S.A.

The lubricant to be used in this invention may be a lubricant which is in the liquid state at the normal room temperature, or at the melting point, or at a temperature less than the melting point of the polyacetal and is selected from mineral oil such as engine oil (motor oil), cylinder oil; animal oil such as sperm oil, tallow oil, lard; vegetable oil such as castor oil, soybean oil, rapeseed oil, palm oil, cottonseed oil, sesame seed oil; synthetic oil such as silicon oil, polybutene; and petroleum wax, such as paraffin oil; higher fatty acid such as palmitic acid, stearic acid, linoleic acid, linolenic acid; ester such as a low alkyl ester of stearic acid or palmitic acid; soap such as Na, K, Ca, Al or Pb salt of stearic acid or palmitic acid.

The present invention will next be described in further detail with reference to the accompanying drawings, in which:

The sole FIGURE graphically illustrates the interrelationship between the bearing load and the temperature rise of bearings.

In carrying out the method of the present invention, when the polyacetal resin powder, heated in the lubricant to a temperature not lower than the melting point of said resin, is cooled, a precipitate forms including the lubricant held in the entire fine internal structure of the resin. In general, the higher the heat treating temperature and the slower the cooling rate, the larger amount of lubricant will be contained in the resin structure. Heating of the system at higher temperatures, however, is not desirable since, when heated at a higher temperature for a long period of time, the lubricant and the resin are oxidized to give a precipitate colored to a greater extent.

According to the experiments conducted by the inventor, the relationship between the heat treating temperature, the resin used, and the lubricant content was as shown in Table 1.

| | |
|---|---|
| Synthetic resin | (1) homopolymer of formaldehyde ("Derlin" 500 powder form) |
| | (2) oxymethylene copolymer of trioxine and ethylene oxide ("Celcon" M90 flaky form) |
| Lubricant: | No. 30 engine oil (equivalent to SAE No. 30) |
| Treating time: | 60 minutes |

Table 1

| Heat treating temperature (°C) | | 165 | 170 | 180 | 190 | 200 |
|---|---|---|---|---|---|---|
| Lubricant content (wt %) | homopolymer | — | 4.5 | 8.0 | 13.5 | 15.0 |
| | copolymer | 8.0 | 11.0 | 12.5 | 14.5 | 15.0 |

Similarly, Table 2 shows the interrelationship between the heat treating time and the lubricant content.

Table 2

| Heat treating time (min.) | | 1 | 5 | 10 | 30 | 60 |
|---|---|---|---|---|---|---|
| Lubricant content (wt %) | homopolymer | 2.0 | 9.5 | 12.0 | 14.0 | 15.0 |
| | copolymer | 2.5 | 10.0 | 12.2 | 14.0 | 15.0 |

Heat treating temperature 200° C.

Table 3

| Lubricant (No. 30 engine oil) wt% | | 1.0 | 1.5 | 2 | 5 | 10 | 15 |
|---|---|---|---|---|---|---|---|
| Coefficient of friction | homopolymer | 0.20 | 0.16 | 0.10 | 0.05 | 0.04 | 0.04 |
| | copolymer | 0.20 | 0.16 | 0.09 | 0.05 | 0.04 | 0.04 |
| Temperature rise of bearings °C | homopolymer | 60 | 56 | 25 | 22 | 20 | 20 |
| | copolymer | 60 | 55 | 25 | 20 | 18 | 20 |

Table 3 shows the interrelationship between the lubricant content and the bearing performance.

The test conditions are the same as those indicated in Table 4.

The measurements were conducted 110 to 120 minutes after the test commenced.

In order to perform the heat treatment effectively, it is preferable to treat the entire system in a tightly enclosed vessel at atmospheric pressure, which vessel is evacuated and then filled with a neutral or inert gas for example nitrogen or argon. In this manner, the lubricant and resin being treated in the vessel are effectively prevented from oxidation and a precipitate is formed which is practically not colored.

It is to be noted that impregnation of the lubricant into the polyacetal resin structure can be made more effective by just adding and mixing into the lubricant less than 3 wt percent of a phtholic ester such as dioctyl phthalate (DOP) or dibutyl phthalate (DBP).

The following method is adopted to disperse into the polyacetal powder, the lubricant such as paraffin wax which is in a solid state at the normal room temperature and is in the liquid state at the melting point of the polyacetal or at a temperature less than the melting point of the polyacetal, but above room temperature.

The synthetic resin powder is mixed with an excess amount of paraffin wax, suitable for use in water, while being heated at a temperature now lower than the melting point of said resin and subsequently the temperature of the mixture is gradually lowered to cause the polyacetal resin to precipitate or deposit. During this heat treatment, the upper zone of the liquid portion of the system is separated off from its lower precipitate portion, which includes polyacetal resin and paraffin wax uniformly distributed therein. Experiments have shown that the percentage content of paraffin wax in the resin composition obtained in this manner is practically the same as that in the one containing liquid lubricant.

Accordingly, the lubricant containing polyacetal resin material made according to the present invention remains unchanged in character and maintains its uniform lubricant containing structure even when it is finely divided into powdery form and further is molded by conventional extrusion, injection or compression techniques. This characteristic feature of the inventive material clearly distinguishes it from the conventional oil impregnated plastic bearing material described hereinafter.

Namely, there is disclosed in U.S. Pat. No. 3,380,843 the oil contained polyacetal bearings in which polyacetal powders are coated on a metal substrate by a synthetic resinous adhesive to form a porous coating layer of the polyacetal powders. Said porous layer is considered to be a porous layer having apertures or openings linked up with each other.

In this case, if a pressure is applied to the bearing surface, the impregnated oil exudes from the mating surface of the bearings and the impregnated oil flows out through the apertures or openings of said bearing surface layer resulting in not obtaining a sufficient oil film on the mating surface. The impregnated oil is not able to flow out from the parts except from the mating surface of the bearings when the temperature of the bearings is raised.

However, this does not mean that the solid lubricant may be substituted for the lubricant which is in the liquid state at the normal room temperature or at the melting point of the polyacetal or at the temperature less than that of the polyacetal, but above room temperature, since the polyacetal bearings containing the solid lubricant serves as an improvement to the load carrying capacity to some extent but does not serve as an improvement of the self lubricant property as well as the speed characteristic property.

It is a characteristic feature of this invention to provide an injection or extrusion molded bearing material having the lubricant uniformly dispersed therein, the lubricant being in the liquid state at the normal room temperature or in the solid state at the normal room temperature but in the liquid state at the temperature of the melting point of the polyacetal or at a temperature less than that of the polyacetal melting point but above room temperature.

As will be apparent from the foregoing description, bearings of lubricant-containing polyacetal resin made by the method of the present invention are uniform in structure with the lubricant held in an independently particular state uniformly distributed in the entire resin structure and this characteristic is effective to eliminate the danger of any excess amount of lubricant oil flowing out of the inventive material over its bearing surfaces or other adjacent area as the result of heat buildup caused by variation of the ambient temperature or by friction between the mating surfaces.

In the bearings of the present invention, the lubricant is firmly sustained on the mating surface as an oil film thereby obtaining the excellent load carrying capacity and the speed characteristic property.

The lubricant containing polyacetal bearings of the present invention can not contain any further oil owing to the dispersion of the lubricant as independent particles in the polyacetal bearings and also one cannot extract the lubricant from said bearings by, for example, Soxhlet's extractor. Therefore, the amount of the lubricant is measured by extracting the lubricant from film-like turning scraps of the bearings having 5 microns or less than 5 microns in thickness by means of the Soxhlet's extractor.

It has been observed from experiments as shown in Table 3 that in order to give the good bearing performance to the polyacetal molded article and to improve the load carrying capacity as well as the temperature rise of bearings, at least 2 wt percent of the lubricant, especially more than 3 wt percent of the lubricant must be added in the molded article of the polyacetal so as to uniformly disperse into the polyacetal molded article as finely divided particles separated from each other and that more than 15 wt percent of the lubricant is not contained in the molding material owing to the degradation of the polyacetal thereby depressing the worth of the molded article.

Some practical examples embodying the present invention will next be described in detail.

EXAMPLE

Polyacetal powder (trade name "Celcon" M90) in flaky form was mixed with an excess amount of engine oil equivalent to SAE No. 30 and the mixture was agitated at an elevated temperature of 170° C for 1 hour and left to stand still until the molten polyacetal particles started to deposit. The fine particles of the molten polyacetal resin, thus collecting in the bottom of the system, combined with each other to form an integral mass. The polyacetal deposit was cooled slowly in the oil and the upper oil portion of the system removed to obtain a solid mass of light yellow substance.

The solid mass of substance obtained in this manner was cleaned of any oil adhering to its surface and thereafter fed into a grinding wheel to be converted into a powder form of molding material. This material was subjected to heat and pressure on a molding machine to obtain cylindrical bearing units of 20 mm. ID, 30 mm OD and 30 mm length.

According to the oil-extraction tests conducted with the bearing units, they were found to contain the lubricant oil in a weight percentage of 10 percent.

Further, a bearing piece containing 5 wt percent of said engine oil obtained according to the same general method as mentioned above is tested on a vertical type bearing tester for the temperature rise and the coefficient of friction in comparison with conventional bearing units.

Specimen No. 1 is a bearing molded from polyacetal resin containing 5 wt percent of engine oil. Specimen No. 2 is a bearing molded from polyacetal containing 5 wt percent of $MoS_2$. Specimen No. 3 is a bearing molded from high molecular weight polyethylene containing 5 wt percent of graphite. Specimen No. 4 is a bearing molded from polyacetal alone.

The comparison test has revealed that the bearing of this invention gives a low coefficient of friction and a less temperature rise, and further, a great improved load carrying capacity as indicated in the Table 4 and referred to in the attached drawing.

Table 4

| Sliding Speed m/min. | | | 24 | | | |
|---|---|---|---|---|---|---|
| Load kg/cm$^2$ | 5 | | 30 | | 60 | |
| Temperature Rise (°C) Coefficient of Friction | °C | $\mu$ | °C | $\mu$ | °C | $\mu$ |
| Specimen No. 1 | 19 | 0.06 | 33 | 0.05 | 40 | 0.04 |
| Specimen No. 2 | 44 | 0.10 | 52 | 0.10 | 120 | More than 0.15 |
| Specimen No. 3 | 62 | 0.15 | — | — | — | — |
| Specimen No. 4 | 43 | 0.23 | — | — | — | — |

The figure graphically illustrates the results of comparative performance test conducted with bearing of this invention of the specimen No. 1 as shown in curve A, another bearing of the specimen No. 2 as shown in curve B, and the third bearing of the specimen No. 3 as shown in curve C.

These tests were conducted with a sliding speed of 24 m/min and a load increased step-wise by 1 kg/cm$^2$ at interval of 10 minutes up to 10 kg/cm$^2$ of the accumulate load and by 10 kg/cm$^2$ at interval of 10 minutes in the case of over 10 kg/cm$^2$ of the accumulate load.

In the drawing, the solid lines indicate the variation of the coefficient of friction and the broken lines indicate the variation of temperature rise of the bearing.

It will be observed from the graphical illustrations of the accompanying drawing that the bearing material according to the present invention gives a reduced coefficient of friction, and is stable under varying load conditions and also gives a very limited temperature rise.

It has been confirmed from experiments that although only No. 30 engine oil is used as the lubricant in the example of this invention, other lubricants which are in the liquid state at the normal room temperature or in a solid state at the normal room temperature but in the liquid state at the temperature of the melting point of the polyacetal resin or a temperature less than that of the melting point of polyacetal (but above room temperature), for example, wax or higher fatty acid ester can be used as mentioned above to obtain similar improved results.

As occasion demands, a solid lubricant, such as $MoS_2$ or graphite, may be used together with the said lubricants of the invention.

While several complete embodiments of the invention have been disclosed herein, it will be appreciated that modification of these particular embodiments of the invention may be resorted to without departing from the scope of the invention.

What is claimed is:

1. A method of making impregnated bearings from a polyacetal resin material containing organic lubricant which is liquid at room temperature and/or at the melting point or a temperature less than the melting point of the resin, said method comprising the steps of mixing a polyacetal resin with from 2 to 15 percent by weight of lubricant, at a temperature not lower than the melting point of the said resin to melt them together, cooling the melt system to solidifying the impregnated product, forming powder from the impregnated product and molding into bearings.

2. A method of making bearings from a polyacetal resin material containing lubricant as in claim 1 and wherein the lubricant is an engine oil.

3. A method as in claim 1 where the lubricant is an oil present in more than 3 percent by weight.

4. A method as in claim 1 including the step of selecting the polyacetal resin from a group consisting of homopolymers of formaldehyde, and an oxymethylene copolymer of trioxane and ethylene-oxide.

5. A method of making bearings from a polyacetal resin material containing lubricant as in claim 1 and comprising the steps of selecting the lubricant from the group consisting of mineral oils, animal oils, vegetable oils, synthetic oils, paraffin wax, higher fatty acids, esters of higher fatty acids, and soaps selected from Na, K, Ca, Al or Pb salts of higher fatty acids.

6. A method as in claim 1 including the step of heating the resin and lubricant in an inert gas atmosphere.

7. A method as in claim 1 including the step of heating the resin and lubricant in an inert gas atmosphere and at atmospheric pressure.

* * * * *